May 27, 1969  H. A. MARKHAM  3,446,211
SURGICAL CLAMP

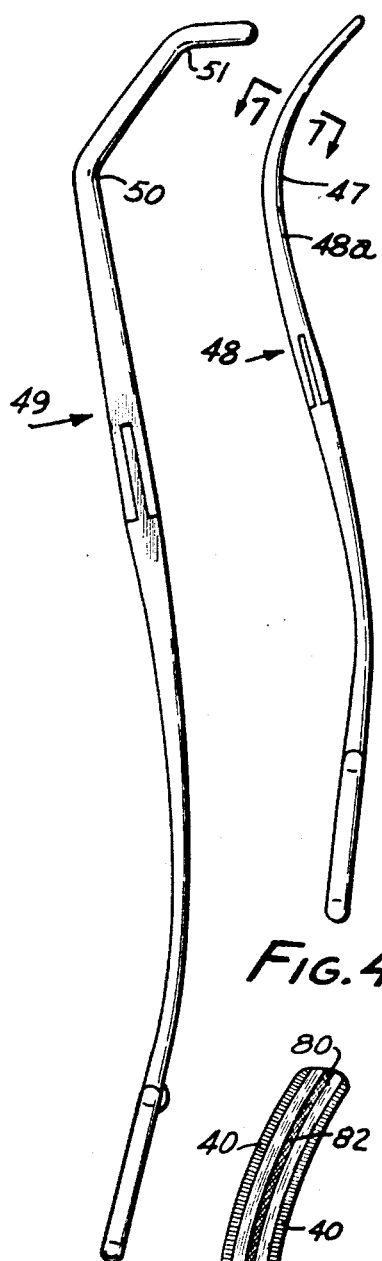
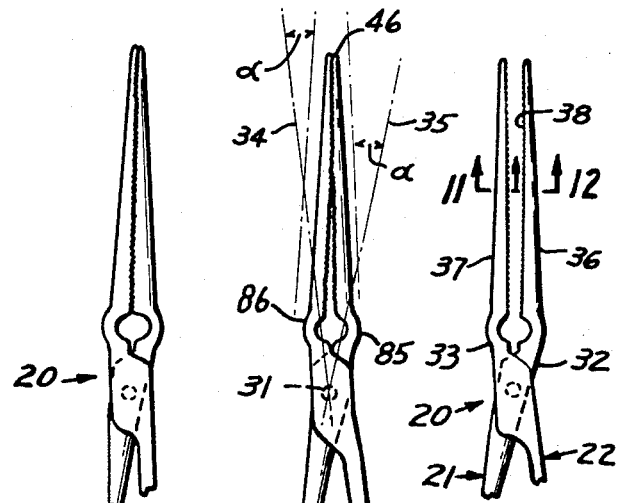
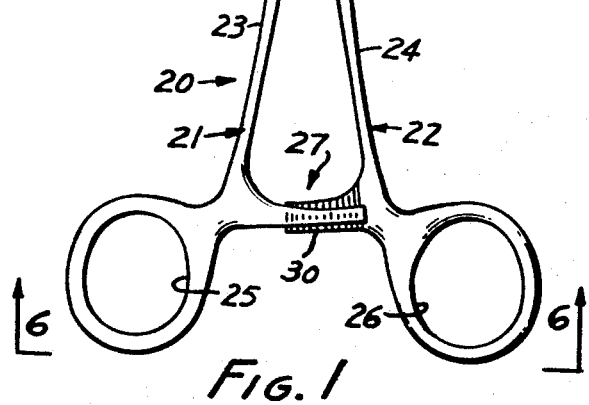
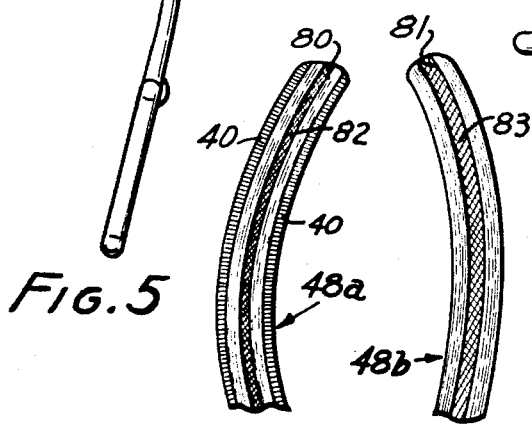
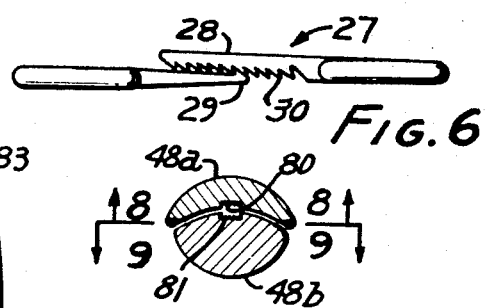
INVENTOR.
HAROLD A. MARKHAM

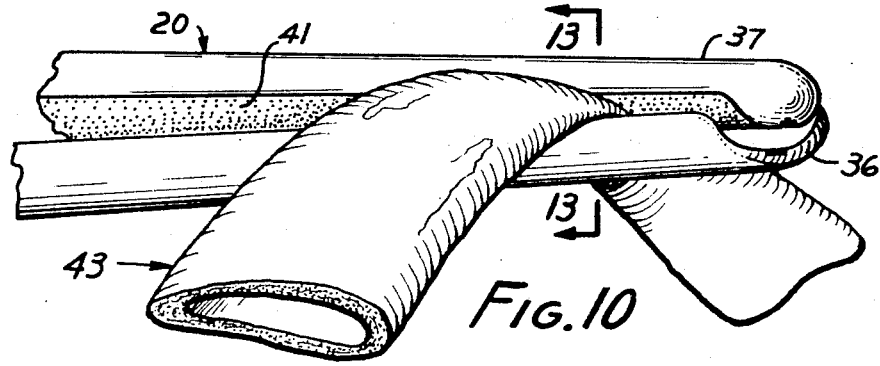
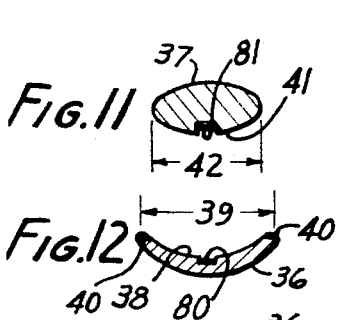
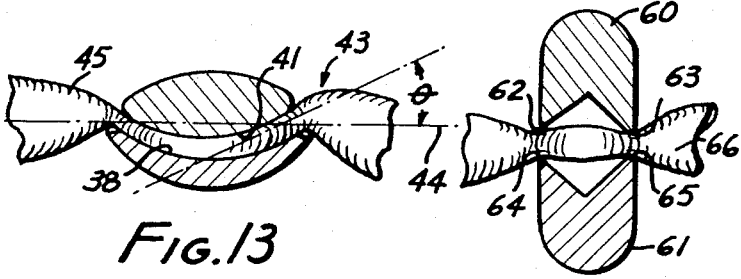
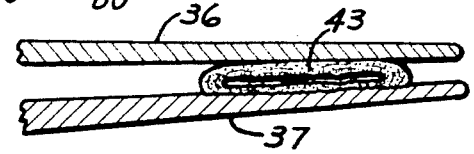
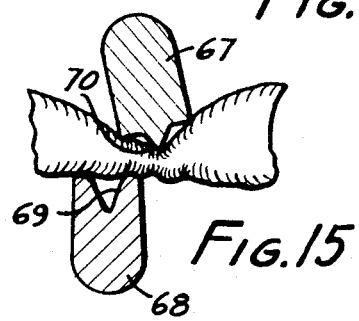
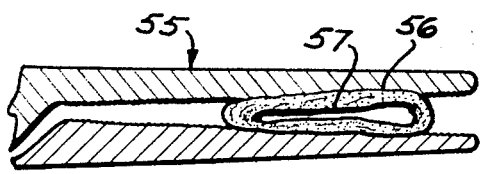
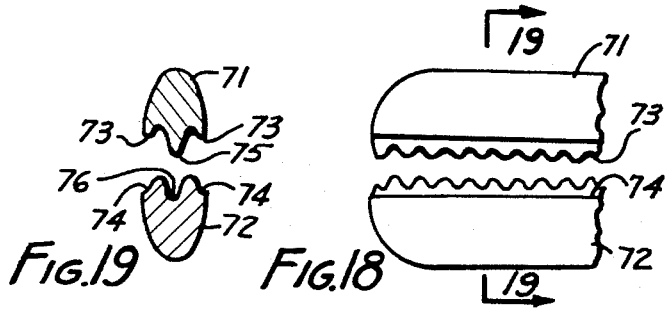

Filed Nov. 9, 1967  Sheet 3 of 3

INVENTOR.
HAROLD A. MARKHAM
BY
ATTORNEYS.

United States Patent Office 3,446,211
Patented May 27, 1969

3,446,211
SURGICAL CLAMP
Harold A. Markham, 6637 Drexel Ave.,
Los Angeles, Calif. 90048
Continuation-in-part of application Ser. No. 594,807,
Nov. 16, 1966. This application Nov. 9, 1967, Ser.
No. 685,235
Int. Cl. A61b 17/12, 17/28
U.S. Cl. 128—322
18 Claims

ABSTRACT OF THE DISCLOSURE

A surgical clamp which comprises a pair of pivotally joined members having a handle portion on one side of the pivot and a clamping portion on the other, the clamping portions being oppositely concave and convex, the chord of the convex member being shorter than the chord of the concave member. Each of the members includes a spacer portion between the pivot and its clamping portion so that the clamping portions incline toward each other at an angle which differs from the angles made by the handles. Initial closure thereby occurs at the free (distal) end instead of at the pivot end. A resilient, elongated grip element is fixed to the concave member so as to exert a resiliently yielding instead of a rigid force on the body being occluded.

---

This is a continuation-in-part of applicant's co-pending patent application, Ser. No. 594,807, filed Nov. 16, 1966, now abandoned, entitled "Surgical Clamp."

This invention relates to surgical clamps.

The surgical clamp art is highly developed because the functional requirements are so severe. Broadly speaking, these clamps are used to occlude parts of the body which enclose a cavity, such as veins, arteries, aortas and the like, there to stop or to restrict fluid flow therethrough. When it is considered that severe hemorrhages occur when one of these clamps slips, it is understandable why the requirements for retention of the body element within the clamp both as to side slippage through the clamp and forward slippage out of its end are so stringent. The results of a slip are often fatal.

While a very tight clamping or holding action may be very effective as to shutting off flow, it may cause severe complications in the body member to which it clamps. The body member ordinarily includes at least several physiological layers, compressive and puncturing damage to any of which can result in severe post-operative complications. For example, bruising of the inner layers of an artery can cause embolisms and clots. Perforations of the member can result in hemorrhages.

It is an object of this invention to provide a clamp which can reliably occlude a body element while using minimum force, thereby causing minimal or negligible damage to the body element itself, and with negligible risk of slippage of the body element from the clamp in any direction.

A surgical clamp according to this invention comprises a first and a second member with a pivot joining these members for scissor-like motion relative to one another. Each of these members includes a handle portion on one side of the pivot and a clamping portion on the other. The pivot axis is normal to a plane of relative rotation in which the members make their relative motions.

A concave surface is provided on the clamping portion of the first member and a convex surface is provided on the clamping portion of the second member. These surfaces extend along the lengths of the respective clamping portions with their respective concavity and convexity facing each other and extending laterally of the said length. Each of these surfaces has a chord, the chord of the convex surface being shorter than the chord of the concave surface so that the edges of the concave surface overhang those of the convex surface. Lock means is provided for holding the members in an adjusted position relative to each other. There are no projecting surfaces on these clamping portions extending toward the other, and each of these surfaces subtends an arc of less than 180°.

According to a preferred but optional feature of the invention, the clamping portions extend substantially parallel to a flat plane which is parallel to the pivot. The flat plane lies at an angle to the length of the handle member. A spacer portion spaces the clamping portions from the pivot, whereby the surfaces lie generally parallel to and spaced apart from each other when the members are in some intermediate position. Initial contact between the surfaces is made at a location spaced from the pivot by at least a part of the respective surfaces, and additional clamping force at the handles results in a progressive movement of the point of contact toward the pivot.

According to another preferred but optional feature of the invention, a resilient, elongated grip element may be fixed to the concave member, whereby to exert a resiliently yielding force on the body which is being occluded.

The above and other features of this invention will be fully understood from the following detailed description and the accompanying drawings in which:

FIG. 1 is a plan view of the presently preferred embodiment of the invention;

FIGS. 2 and 3 show two different operative positions of the device of FIG. 1;

FIGS. 4 and 5 are side elevations of two different modifications of the device of FIG. 1;

FIG. 6 is a partial bottom view taken at line 6—6 of FIG. 1;

FIG. 7 is a cross-section taken at line 7—7 of FIG. 4;

Figure 20:
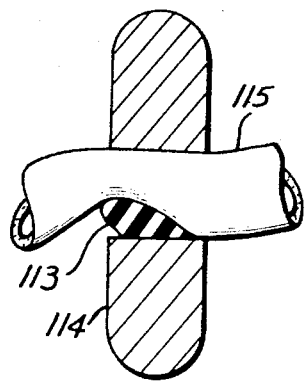
Figure 21:
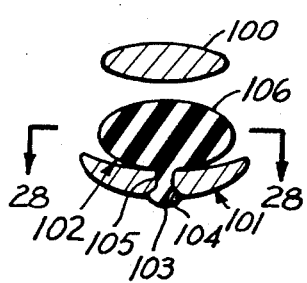
Figure 22:
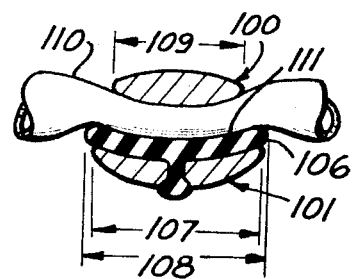
Figure 23:
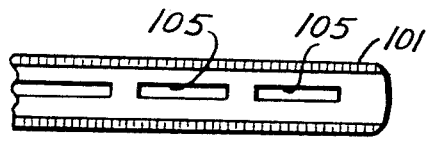
Figure 24:
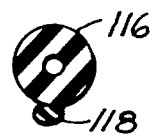
Figure 25:
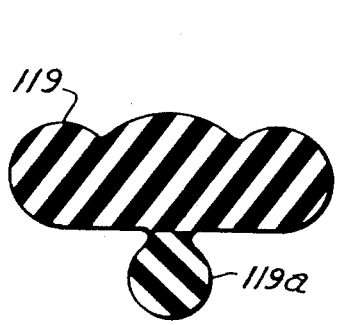
Figure 26:
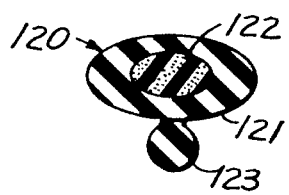
Figure 27:
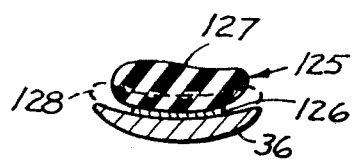
Figure 28:

FIGS. 8 and 9 are modified cross-sections taken at lines 8—8 and 9—9, respectively, of FIG. 7;

FIG. 10 shows the embodiment of FIG. 1 in use;

FIGS. 11 and 12 are cross-sections taken at lines 11—11 and 12—12 of FIG. 2;

FIG. 13 is a cross-section taken at line 13—13 of FIG. 10;

FIGS. 14 and 15 are fragmentary cross-sections showing prior art devices in use and illustrating their disadvantages;

FIG. 16 shows the embodiment of FIG. 1 in use illustrating some of its advantages;

FIG. 17 is a cross-section similar to that of FIG. 16 showing additional disadvantages of certain prior art;

FIG. 18 is a side elevation of another prior art device;

FIG. 19 is a cross-section taken at line 19—19 of FIG. 18;

FIG. 20 is a lateral cross-section of a common clamp modified with a resilient member, illustrating complications which are overcome by this invention;

FIGS. 21 and 22 are lateral cross-sections of another embodiment of the invention in the open and in the operative (closed) conditions, respectively;

FIG. 23 is a plan view of a portion of FIG. 21;

FIGS. 24, 25 and 26 are cross-sections of alternate shapes for a part of the device of FIG. 21;

FIG. 27 is a lateral cross-section of a modified embodiment of the type shown in FIG. 21; and FIG. 28 is a plan view taken at line 28—28 of FIG. 21.

A surgical clamp 20 according to the invention is shown in FIG. 1 which includes a first and a second member 21, 22, respectively. These members have respective handle portions 23, 24 equipped with loops 25, 26 to receive the fingers. Lock means 27 is provided, the preferred embodiment of which is a ratchet rack 28 on one member and a ratchet catch 29 on the other member. It is immaterial which member carries the rack or the catch. The handles are springy enough that the ratchet rack and catch can readily be separated. When the handles are brought toward each other, the catch snaps along the rack and remains engaged to one of teeth 30. A pivot 31 joins the members together for relative rotation in the plane of FIG. 1. The axis of pivot 31 is normal to the plane of FIG. 1.

A pair of spacer portions 32, 33 is respectively provided on the first and second members. These spacer portions extend in the general direction of the hnadle as shown by handle axis 34, 35 in FIG. 1. At points spaced from the pivot by the spacer portions are the inceptions of clamping portions 36, 37, respectively, on the first and second members. These clamping portions extend to the free ends of the members. It is obvious that moving the loops toward one another will cause the clamping portions to move toward and away from each other in a scissor-like motion. The construction and arrangement of the clamping portions will now be described.

Clamping portion 36 includes on its inner surface facing toward clamping portion 37 a concave surface 38. This surface extends generally in a direction parallel to a plane which is normal to the sheet of FIGS. 1–3 (and to the pivot) and diverges from axis 34 by an angle α (see FIG. 1). The concave surface has a chord 39 (see FIG. 12) and preferably, although not necessarily, includes an irregular surface finish 40 which in the preferred embodiment constitutes a very fine shallow straight knurl at its edges, and a pocked or roughened surface in between, formed by means such as etching. This knurl, when used (and it is optional) is formed across the arcuate surface and forms a continuation thereof, rather than a flat adjacent shoulder.

A convex surface 41 is disposed on clamping portion 37, and this has a chord 42 which is shorter than chord 39. Both the convex and concave surfaces are generally curved, although they need not be circular arcs. In the preferred embodiment, they are circular arcs. As best illustrated in FIG. 13, the angle θ shows the deviation of a body member 43, such as an artery, from a nominal axis 44 which would be the axis of this tubular part when stretched straight out and extending laterally across the clamp. Angle θ represents the maximum deviation from this axis and the clamp is so constructed that this angle will never be as great as 90°.

The surfaces both extend parallel to respective planes which are parallel to the pivot, and slope inwardly from axes 34 and 35, at an angle α. The ends of the clamping portions will therefore touch before those parts closer to the pivot.

The surgical clamp 20 is shown in FIG. 1 in the position of first contact between the concave and convex surfaces, on about the sixth tooth 30. It will be noted that this first contact occurs at the distal end, that is to say at the tip of the instrument. The device is so constructed that these surfaces will be substantially parallel to each other when the ratchet is at some intermediate position illustrated in FIG. 2. In the preferred embodiment, this is on about the third tooth 30. This latter position is a desirable one for clamping arteries, and its condition in use is shown in FIG. 16, where an artery 45 is shown about closed, with the clamping portions in the condition of FIG. 2. To illustrate further clamping action, FIG. 3 shows the clamp closed tightly with the point of contact 46 between the two surfaces having advanced from the tip to a medial position, and on about the eleventh ratchet tooth 30. The point of contact is spaced from the pivot by some portion of the region of the said surfaces.

FIGS. 1–3 illustrate the device in a straight, needle-nose configuration which is to say that the clamping portions extend parallel to the planes of FIGS. 1–3.

FIGS. 4 and 5 show alternate embodiments of the invention in which the plan views are essentially the same as in FIG. 1, except that the clamping portions are curved in side elevation which enables one to take hold of different portions of arteries, aortas and the like, such as at the side in order only partially to occlude the structure. FIG. 4 shows a gradual curve 47 in a surgical clamp 48 which is in all other respects the same as that of FIG. 1. Some of its parts are shown in FIGS. 8 and 9, i.e. clamping portions 48a and 48b.

FIG. 5 shows a surgical clamp 49 also similar in plan view to FIG. 1 but with clamping portions which include a pair of bends 50, 51 which will serve to isolate only a portion of an aorta.

FIGS. 7–9 illustrate the general construction of concave and convex surfaces in connection with FIG. 4, while FIGS. 11, 12 and 13 illustrate these features with respect to the device of FIG. 1. It will be seen that they are identical with the exception that in the embodiments of FIGS. 8 and 9, the surfaces bend in the aforesaid flat plane, which is parallel to the pivot.

The knurl is best shown in FIG. 8. FIG. 9 illustrates that the convex surface may also be roughened or modified. While the concave and convex surfaces may be continuous at their mid-sections, it has been found that improved retention properties result, especially as to slippage out the tip, if longitudinally-extending recesses 80, 81 (FIG. 7) are provided in these surfaces, and even more improvement results if the bottoms of these recesses are covered by shallow lateral serrations (straight knurls), cross-hatch knurls 82, 83, or other irregularities. However, these are recesses and not projections, and no mutually engaging or meshing surfaces are formed which could puncture or shear the tissue.

In one suitable embodiment, the chords are on the order of ⅛ inch wide, and the arcs on the order of 0.030 inch deep. The width of the recesses is on the order of ¼ the width of the chord.

The device may advantageously include, on the side of the pivot which carries the clamping portion, a pair of flexures 85, 86 which may comprise relatively stiff bends at which flexure can occur that enables the progressive movement of point of contact to occur with somewhat less flexure of the clamping portion.

The operation of the device is straightforward. The portion of the body to be occluded is simply placed between the clamping members, and the loops are brought forward so that the desired degree of occlusion is provided. FIG. 10 illustrates how an artery may be held between the clamping portions, and FIG. 13 illustrates what may be called the "hitch" principle embodied herein. A longitudinal pull such as may be generated by pressure within one part of the body member 43 will tend to move it along its own axis. However, such a pull simply moves the body member into tighter contact with the concave and convex surfaces, and this class of movement is prevented.

Endwise slippage is prevented by the fact that the initial contact between the two clamping surfaces occurs at the distal end so that with increasing closure the body member is increasingly strongly held within the clamping portions. The setting shown in FIGS. 2 and 16 is designed to be about the spacing needed for minimum occlusion of the body member, and this condition is best shown in FIG. 16 where the lumen of the artery is just about closed. It will be noted that this closure extends uniformly across the lumen. Previously known clamps which have simple scissoring action are likely to create the situation shown in FIG. 17 where a prior art clamp 55 with a pure scissoring action is clamping onto an artery 56 with the lumen 57 being closed from the side adjacent to the pivot. This provides an unequal force on the two sides, and the left-hand side of the lumen is likely to be injured by crushing before the right-hand side can be closed. This is not true in the present embodiment wherein the occlusion is substantially straight across.

The recesses 80 and 81, when used, take in a small amount of tissue, but without compressive or puncturing action, to retain it against slippage out the tip of the device.

FIGS. 14, 15, 18 and 19 show previously known clamps wherein portions of the clamps are directly opposed by other portions such that direct crushing and bruising of the artery can result. For example, in FIG. 14, jaws 60, 61 have edges 62, 63, 64 and 65 which exert a sharp pinching action against the artery 66 with both the results shown in FIG. 17 and the disadvantage in FIG. 14 comprising excessive crushing and shear cutting action at the two edges of the jaws.

FIG. 15 shows jaws 67, 68 with an interlocking groove 69 and a rib 70 directly opposed such that the same cutting action as in FIG. 14 can result, but in addition something worse, because in this device it is possible for the jaws to slip sidewise relative to one another, thereby causing an even sharper shearing action and an unreliable occluding action.

To overcome this disadvantage, the device of FIGS. 18 and 19 was developed which constitutes a pair of jaws 71, 72 having multiple teeth 73, 74 extending along these edges and interlocking ribs 75, 76 extending along the jaws. These constitute multiple points at which damage may be done to the artery and also provide opposed pinching, punching and shearing surfaces.

Having in mind these prior art constructions, it will be appreciated why the chord of the concave surface is longer than that of the convex surface. It will be noted that there are no opposite discontinuous points that are opposed to each other whereby a direct shearing or punching action could be exerted on the body member. Instead, the body member simply departs from the region between the surfaces at a gentle angle, and where it goes over the edge of the concave member there is no opposing device to exert any compressive force on this edge at all. In brief, this constitutes a reliable retention means both as to trapping the member against end slippage and side slippage, and which also occludes the member uniformly so that excessive forces are not exerted on one edge in order to close the other edge, and also so that there is no possibility of punching, gouging or pinching at the edge or any place else.

The two clamping portions are not only self-centering, but they are uniquely self-centering. When the center points of the chord are not aligned, the portions exert side forces which center them. The scissoring forces aid in maintaining this centering action, and endwise pulling on an artery sets up forces which are resisted by these actions, and which causes a normal force against the clamping portions which amplifies the retentive force on the body member. Therefore, comparing devices of this kind of a given width with prior art devices of the same width, a greater retentive force results, often including a greater tissue surface with lesser unit pressure loads. This device could, if desired, be made thinner than existing devices, still providing the same retentive forces as the prior art.

There is a theory held by many surgeons that a resiliently yielding grip on vessels is preferable to a grip made by two relatively stiff hard metal members. A resilient grip can readily be provided in any of the clamps of this invention with ease, still retaining the concave-convex relationship of the opposed metal surfaces. One means is shown in FIGS. 21 and 22.

A convex clamp portion 100 which is in all ways similar to portion 36 in FIG. 10 is opposed to a concave clamp portion 101, which is similar to portion 37 of FIG. 10. They are similarly mounted to a pivot, and formed as a part of a complete assembly as in FIGS. 1, 4 or 5, or of any other desired instrument design. However, clamp portion 101 is modified by having attached to it a resilient, elongated grip element 102. It is attached by means of a bulb 103. The bulb is pressed into a slot 104 formed in the clamp portion, and a part of it stands on the opposite side of the clamp portion from the concave surface, leaving a tongue 105 in the slot formed of the material from which the bulb is made. The bulb is made of relatively stiff material such as silicone in order to provide a strong attachment. Inside the convex surface, and so as to be held by it to portion 37 is an elongated lozenge 106. The material of the lozenge may be of resilient material such as sponge rubber, shown in FIG. 21, hollow rubber tubing shown in FIG. 24, or a rubber tubing filled with sponge rubber as shown in FIG. 26. These are merely a few examples of a resilient, elastic lozenge which can be deformed by mechanical pressure exerted on it.

FIG. 21 shows the open position, with the lozenge in its relaxed condition. In this condition, its lateral dimension is less than chord width 107 of the concave portion, and it projects toward the convex portion. In FIG. 22, an artery 110 is shown occluded by the device. The dimensions of the lozenge are selected so that, when occlusion occurs, the lozenge is distorted and spreads out laterally to a chord width 108 which is greater than the chord width 109 of the convex element, and is preferably as great or greater than chord width 107. It is to be noted that the forces exerted on the lozenge tend to cause it to deform laterally and to assume a shape 111 on the top adjacent to the artery which is a curved concave arc geometrically similar to the arc of the concave portion 101. Thus, the metallic surface acts as a "forming" means for the lozenge, and the lozenge provides a resiliently yieldable means between the artery and the metal portion. The dimensions and physical properties of the lozenge are selected so that the shape of FIG. 22 is assumed when the artery is occluded. While some occlusion will sometimes result before this shape is reached, this is not the primary intent, because a full-area contact at the time of occlusion is one of the objectives of this invention.

FIG. 20 illustrates the utility of and one need for the convex surface. Here a lozenge 113 has been cemented to a flat jaw 114 and is shown occluding an artery 115. Pressure in the right-hand side of the artery is causing the lozenge to "roll out." An unreliable grip is made, and cutting can occur at the right-hand edge. This cannot occur where the concave surface gives side support to the lozenge and prevents roll-out.

FIG. 24 shows a lozenge 116 of rubber tubing attached to a bulb 118 of silicone.

FIG. 25 shows a modified cross-section for a lozenge 119, the three leaves of its pattern serving further to resist lateral forces, but still being deformable to the concave shape. The lozenge is attached to a bulb 119a.

FIG. 26 shows a lozenge 120 with rubber tubing 121 on the outside, sponge rubber 122 filling the inside, and an integral bulb 123 of silicone rubber.

FIG. 27 shows concave portion 36 with a lozenge 125 bonded to the portion by bonding agent 126 instead of by a tongue and slot. The occluding function is the same as in FIG. 21. FIG. 27 shows, in addition to a different attachment means, the pre-forming to a concave shape 127 which increases the initial contact area between the artery and the lozenge. The fully compressed shape is shown by dashed line 128.

The lozenges are shown in their relaxed conditions in FIGS. 21 and 24–27, inclusive.

FIG. 23 shows a plurality of slots with bridges between them. These bridges prevent the slots from making the clamps unduly springy.

An advantage of the devices of FIGS. 21–26 over that of FIG. 27 is the greater ease of cleaning and sterilizing a clamp without an insert, and the ease of thereafter applying a sterile insert when wanted.

The term "yielding" as used herein does not imply looseness. Yielding forces are just as reliable and may be just as great as non-yielding forces. The term is used to imply that the application of an increased force against the resilient element may cause it to recede somewhat. It will, of course, increase its resistive force as the deformation increases. This is, however, a different sort of grip from that exerted by a rigid metal surface, which will oppose forces of any level without substantial deflection or deformation within design limits, of course. Both will serve reliably to occlude the vessel.

This invention is not to be limited by the embodiments shown in the drawings and described in the description which are given by way of example and not of limitation, but only in accordance with the scope of the appended claims.

I claim:

1. A surgical clamp comprising a first and a second member, a pivot joining said members for scissor-like motion relative to one another, each of said members including a handle portion on one side of the pivot, and a clamping portion on the other, the pivot lying normal to a plane of relative rotation in which the members make their relative motions; a concave surface on the clamping portion of the first member and a convex surface on the clamping portion of the second member, said surfaces extending along the lengths of the respective clamping portions, with their respective concavity and convexity facing each other and extending laterally of said length, each of said surfaces having a chord, the chord of the convex surface being shorter than the chord of the concave surface; and lock means for holding the members in an adjusted position relative to each other, there being no other clamping surfaces on said clamping portions, and each of said surfaces subtending an arc of less than 180°, whereby a body part to be clamped can extend from each lateral side of the clamping portions without direct pinching action between the edges of the two portions, and with a maximum angular deviation from the lateral which is less than 90°.

2. A surgical clamp according to claim 1 in which a portion of one o fthe surfaces has an irregular surface finish.

3. A surgical clamp according to claim 2 in which the irregular surface finish includes a knurl at the edges of the concave surface.

4. A surgical clamp according to claim 3 in which a portion of the concave surface is roughened.

5. A surgical clam according to claim 1 in which the said lengths of the clamping portions lie substantially parallel to a flat plane which is parallel to the pivot, and in which the said flat plane lies at an angle to the length of the handle member, a spacer portion spacing the clamping portions from the pivot, whereby the said surfaces lie generally parallel to and spaced apart from each other when the members are in an intermediate position, the initial contact between the surfaces being made at a location spaced from the pivot by at least a part of the respective surfaces.

6. A surgical clamp according to claim 5 in which the material of the clamping portions is springy, whereby increased closure beyond that of the initial contact is represented by the point of contact moving toward the pivot.

7. A surgical clamp according to claim 5 in which the lock means comprises a ratchet rack on one handle portion, and a ratchet catch on the other.

8. A surgical clamp according to claim 7 in which the material of the clamping portions is springy, whereby increased closure beyond that of the initial contact is represented by the point of contact moving toward the pivot.

9. A surgical clamp according to claim 5 in which the clamping portions are bent away from the said plane of relative rotation.

10. A surgical clamp according to claim 9 in which the material of the clamping portions in springy, whereby increased closure beyond that of the initial contact is represented by the point of contact moving toward the pivot.

11. A surgical clamp according to claim 1 in which each of the clamping portions includes a recess.

12. A surgical clamp according to claim 1 in which each of said members includes a flexure between the pivot and the clamping portion.

13. A surgical clamp comprising a first and a second member, a pivot joining said members for scissor-like motion relative to one another, each of said members including a handle portion on one side of the pivot, and a clamping portion on the other, the pivot lying normal to a plane of relative rotation in which the members make their relative motions; a concave surface on the clamping portion of the first member and a convex surface on the clamping portion of the second member, said surfaces extending along the lengths of the respective clamping portions, with their respective concavity and convexity facing each other and extending laterally of said length, each of said surfaces having a chord, the chord of the convex surface being shorter than the chord of the concave surface; lock means for holding the members in an adjusted position relative to each other, and an elongated grip element fixed to the central region of the concave surface including a portion facing the convex surface which is resiliently deformable to a concave surface and a body part which is greater than the chord of the convex element, each of said convex surface and concave surface on the deformed portion subtending an arc of less than 180°, whereby a body part to be clamped can extend from each lateral side of the clamping portions without direct pinching action between their edges, and with a maximum angular deviation from the lateral which is less than 90°.

14. A surgical clamp according to claim 13 in which the said lengths of the clamping portions lie substantially parallel to a flat plane which is parallel to the pivot, and in which the said flat plane lies at an angle to the length of the handle member, a spacer portion spacing the clamping portions from the pivot, whereby the said surfaces lie generally parallel to and spaced apart from each other when the members are in an intermediate position, the initial contact between the surfaces being made at a location spaced from the pivot by at least a part of the respective surfaces.

15. A surgical clamp according to claim 14 in which the material of the clamping portions is springy, whereby increased closure beyond that of the initial contact is represented by the point of contact moving toward the pivot.

16. A surgical clamp according to claim 13 in which the second member is apertured to removably receive a portion of the grip element.

17. A surgical clamp according to claim 13 in which the grip element is bonded to the second member.

18. A surgical clamp according to claim 13 in which the said portion of the grip member is concave in its relaxed condition.

References Cited

UNITED STATES PATENTS

| | | | |
|---|---|---|---|
| 1,852,542 | 4/1932 | Sovatkin | 128—325 |
| 2,668,538 | 2/1954 | Baker | 128—321 |
| 2,743,726 | 5/1956 | Grieshaber | 128—321 |
| 3,209,753 | 10/1965 | Hawkins et al. | 128—321 |

L. W. TRAPP, *Primary Examiner.*